United States Patent [19]
Johnson

[11] 4,400,457
[45] Aug. 23, 1983

[54] DUAL LAYER RECORD ELEMENT AND METHOD

[76] Inventor: Reynold B. Johnson, 548 E. Cresent Dr., Palo Alto, Calif. 94301

[21] Appl. No.: 322,758

[22] Filed: Nov. 19, 1981

[51] Int. Cl.³ .............................................. G03C 5/14
[52] U.S. Cl. .................................. 430/140; 430/496; 430/523; 430/935; 427/127; 427/131; 428/692; 428/694; 428/900; 360/3; 360/134
[58] Field of Search ................ 430/140, 39, 496, 523, 430/524, 935; 427/131, 128; 428/900, 692, 694; 360/2, 3, 134, 135

[56] References Cited
U.S. PATENT DOCUMENTS
4,279,945  7/1981  Audran et al. ...................... 427/130

Primary Examiner—John E. Kittle
Assistant Examiner—Jose G. Dees
Attorney, Agent, or Firm—Flehr, Hohbach, Test, Albritton & Herbert

[57] ABSTRACT

A method of making a dual layer record element for photographically and magnetically recording information respectively on opposite faces thereof and product.

5 Claims, 8 Drawing Figures

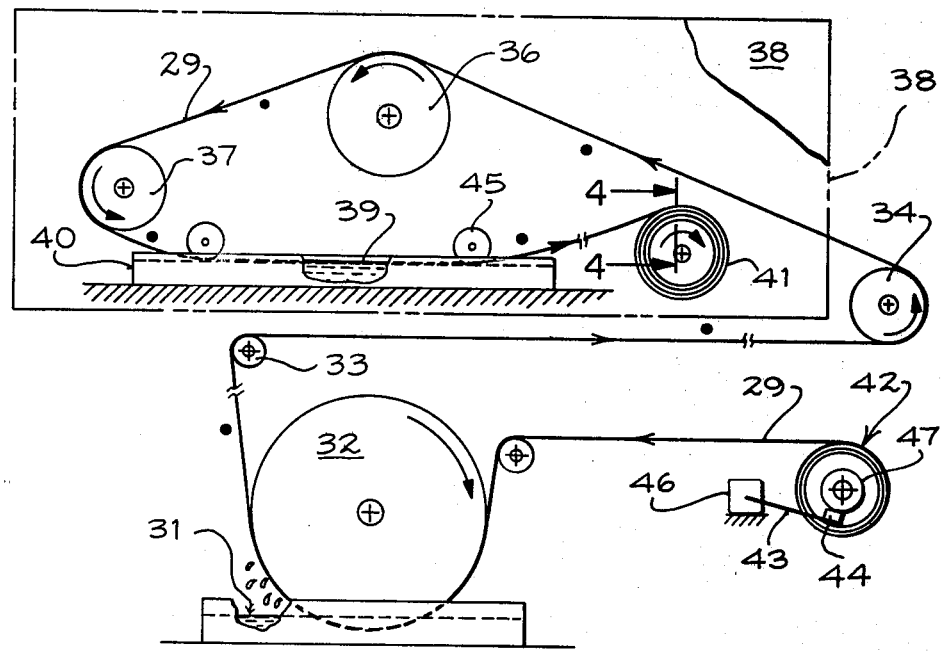
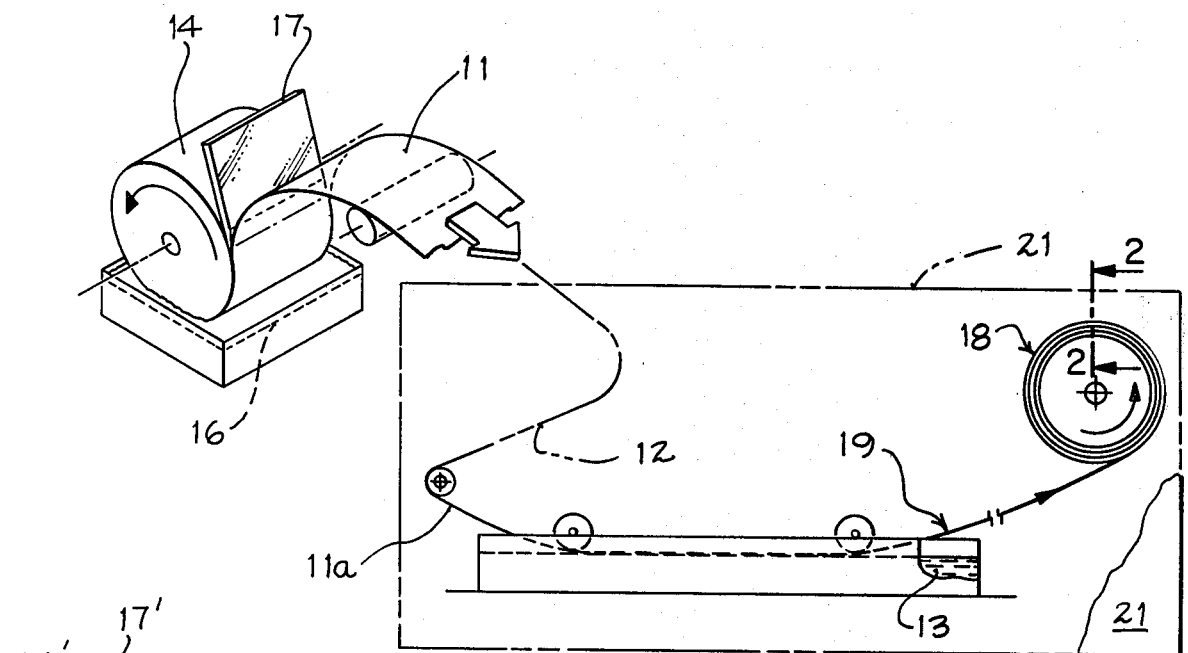
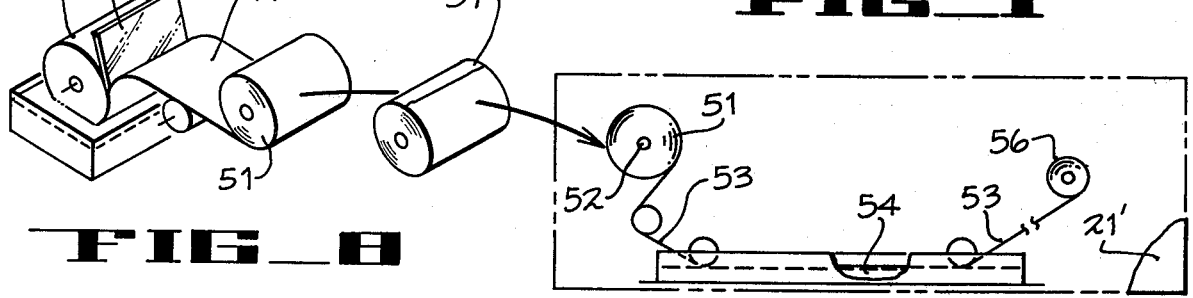

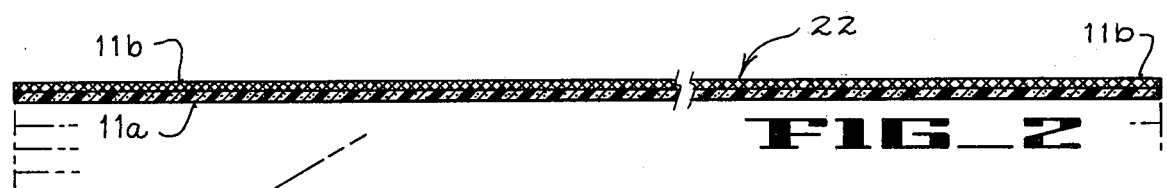
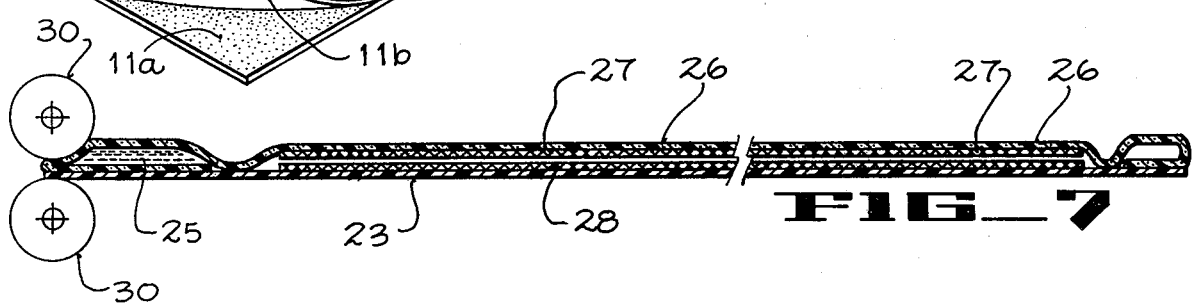
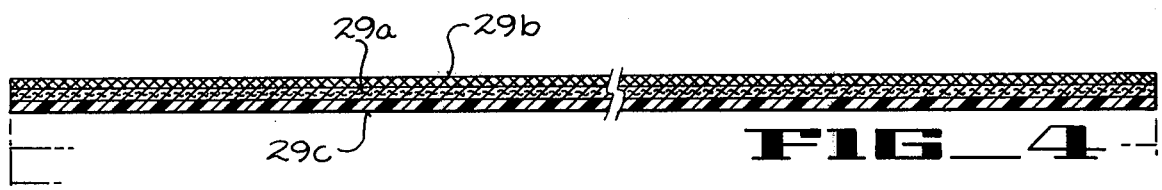
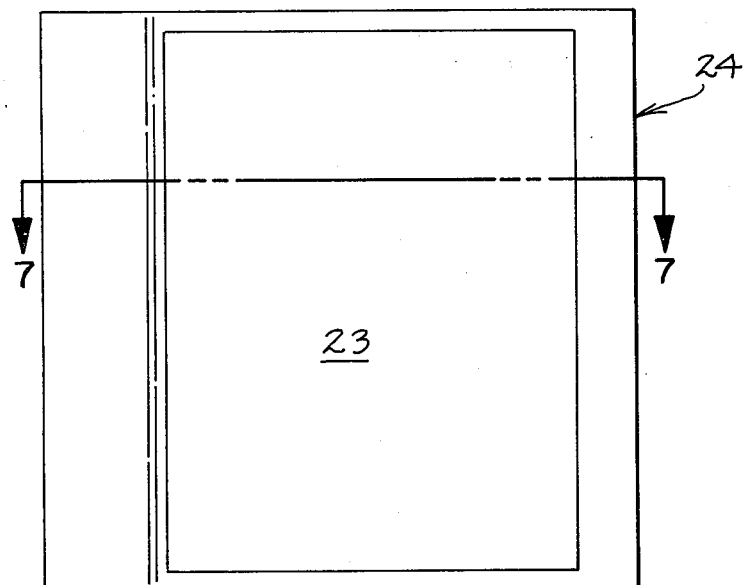

DUAL LAYER RECORD ELEMENT AND METHOD

This invention pertains to a record element of the type suitable for recording both photographically and magnetically on opposite sides of the element whereby by using a suitable player a person can record or play audio information carried on the back of photographs.

According to the prior art a number of patents have issued pertaining, in general, to the concept of employing a three layer record element in which the intermediate layer comprises material such as paper or the like to provide support for a photograph carried on one side and a magnetic surface carried on the other.

In general, as disclosed herein a record element includes a substantially self-supporting layer formed from a mixture of magnetic and resin material. A coating of photoresponsive material applied to one side of the layer permits the element to record information thereon both photographically and magnetically. The foregoing record element has been provided pursuant to a method carrying out the steps of casting a fluid mixture of resin and magnetic material to form a web thereof allowed by passine one face of the web across the surface of and in contact with a body of photoresponsive material to coat one side of the magnetic web. Subsequently the web is cut into desired sizes for use as a combined photographic/phonographic material.

In general a record element is thus provided comprising a layer formed from a fluid mixture of magnetic and resin material together with a coating of photoresponsive material applied to one side of the layer to permit the element to record information both photographically and magnetically on opposite surfaces thereof respectively.

In general it is an object of the present invention to provide an improved record element for recording information thereon both photographically and magnetically.

Another object of the invention is to provide a record element of the kind described at minimum expense.

Yet another object of the invention is to provide a magnetic record surface as an opaque backing sheet to be carried by certain "self-developing" films while carrying photoresponsive material thereon disposed to record information photographically.

Yet a further object of the present invention is to provide an improved method of manufacturing record elements of the kind described.

The foregoing and other objects of the invention will become more readily evident from the following detailed description of preferred embodiments when considered in conjunction with the drawings:

FIG. 1 shows a diagrammatic view, partially in perspective, of a method of manufacturing an elongate dual layered web having magnetically and photographically responsive surfaces on opposite sides according to the invention.

FIG. 2 shows a transverse cross-section of the web taken along line 2—2 of the outer convolution of roll 18 of FIG. 1;

FIG. 3 shows a diagrammatic perspective view of a record element made from the web produced by the method of FIG. 1;

FIG. 4 shows a diagrammatic transverse section view of the outer convolution of roll 41 taken along line 4—4 shown in FIG. 5;

FIG. 5 shows a diagrammatic view of another embodiment of a method for making a web having on opposite surfaces thereof respectively means for magnetically and photographically recording information;

FIG. 6 shows a plan view of a type of "self developing" film characterized by an opaque magnetic record surface disposed on the back side thereof;

FIG. 7 shows an enlarged detail diagrammatic section view taken along the line 7—7 of FIG. 6; and FIG. 8 shows a diagrammatic view partially in perspective of a method according to another embodiment of the invention.

As shown in FIG. 1 a method has been provided characterized by the steps of casting a fluid mixture or slurry of resin and magnetic material to form a web 11 thereof. The mixture or slurry of resin and magnetic material is of suitable known type, as is used in the manufacture of magnetic discs for computers. Web 11 moves along a path 12 and into a light tight chamber 21. Web 11 is then guided in a manner whereby one face 11a of a web 11 passes across and in contact with the surface of a body 13 of known photoresponsive chemical material, such as used in the manufacture of photographic film.

In this manner the face 11a of web 11 becomes coated with a photographically responsive material whereby one side of web 11 can receive information recorded photographically and the opposite face of the same web 11 can receive information recorded magnetically.

As shown in FIG. 1 the casting of web 11 is achieved by rotating a smooth cylindrical surface 14 cyclically to pass into and out of the fluid body 16 of resin and magnetic material in a manner applying a sufficient amount of magnetic material to the surface 14 to form a web thereof. Subsequently the thickness of material retained on surface 14 is peeled away, as by means of a doctor blade 17, to form web 11.

Dual layer record element 22 as shown in FIG. 3 and formed from roll 18 as shown in section in FIG. 2 comprises a magnetic layer 11a and a photographically sensitive layer 11b coated with the photographically responsive material contained within body 13.

As shown in FIG. 3 a photographic/phonographic record element 22 taken from roll 18 discloses the magnetic layer 11a peeled back from a corner of the photographic layer 11b of a dual layer element 22.

According to another embodiment as shown in FIGS. 6 and 7 by changing the nature of the photographically responsive materials maintained in body 13 of FIG. 1 web 11 can be formed to provide an opaque backing layer 23 for a "self-developing" film back 24 of known construction.

One such self-developing photographic bank 24 is characterized by a first transparent layer 26 coated from behind by an appropriate photoresponsive chemical 27 disposed in spaced relation from another photo-interactive chemical 28 carried on the confronting face of backing layer 23. After exposure, rollers 30 compress a deposit of fluid developer 25 sufficiently to discharge and distribute developer 25 into the space between confronting layers of chemicals 27, 28 to develop a recorded latent image. The chemicals 27, 28 are those conventionally used in certain self-developing film of a type sold by Polaroid Corporation of Cambridge, Mass.

Accordingly, a picture will be observable from the front of record element 24, an opaque backing layer 23 will be applied behind the picture for purposes of permitting magnetic recording thereon. By virtue of the fact that layer 23 is opaque other films in a given film pack will not be exposed upon exposure of an overlying photograph.

A further embodiment shown in FIG. 8 discloses a method generally corresponding to the method of FIG. 1 while at the same time suggesting that the method steps need not necessarily be contiguous in time or space. Thus, part of the method includes the formation of a roll 51 of opaque, magnetic, photographic material as described above. The roll 51, after transfer to a supply spindle 52, passes along a given path disposing one face of the web 53 to pass lightly into engagement with the surface of a body 54 of photoresponsive material, as explained above. The photographic/phonographic web 53 thereafter is wrapped to form a take-up roll 56.

Portions of the system previously described have been identified in FIG. 8 by like reference numbers followed by a prime mark (').

According to yet another embodiment as shown in FIGS. 4 and 5 a record element and a method of forming an elongate web from which the magnetic record element can be supplied comprises the steps of passing a web 29 of suitable flexible supporting material, such as a plastic film of suitable acetate or the like, into and out of a fluid mixture 31 of resin and magnetic material to apply a magnetic coating to one face of web 29. Preferably web 29 passes about a relatively large drum or roller 32 having an arcuate portion disposed to travel beneath the surface of mixture 31. Subsequently web 29 travels about pulleys 33, 34, 36 to a drive pulley 37.

A light tight container 38 encloses that portion of the system shown in FIG 5 wherein photoresponsive materials are employed. Drive pulley 37 feeds web 29 to pass the opposite face thereof to travel across the surface of and in contact with a body 39 of photoresponsive material so as to coat the opposite side of the web therewith. The body 39 of photoreponsive materials includes suitable known chemicals of a type used to prepare rolls of photographic film.

Upon leaving the container 40 holding body 39, web 29 passes beneath a guide roller 45 and then travels a sufficient distance to permit the coating to dry whereby the web can be rolled into a given roll 41 thereof using a suitable take-up drive. In FIG. 5 the dots which have been applied along the path of web 29 are disposed (for reference) on the side of web 29 which carries the magnetic coating.

Thus, starting with roll 41 the web material can be cut into pieces of appropriate length to provide the dual function of being able to record information photographically on one side and magnetically on the other as represented in FIG. 4.

Accordingly, an intermediate acetate layer 29a carries a magnetic material 29b thereabove and a layer 29c of photoresponsive material therebelow (taken along the line 4—4 of FIG. 5). Accordingly, a sufficient amount of the fluid mixture 31 of resin and magnetic material is applied to web 29 to coat one face of the web sufficiently to permit information to be magnetically recorded thereon.

Web 29 is disposed sufficiently tightly about cylindrical roller 32 so as to expose only a single face of the web 29 as a cylindrical surface of roller 32 and web 29 pass through mixture 31.

The foregoing tautness in web 29 can be achieved by driving the entire web system from drive roller 39 while at the same time applying a braking action to supply roll 42. The foregoing braking action is diagrammatically represented by the elongate leaf spring 43 carrying a brake shoe 44 on its distal end, and mounted on a fixed base 46.

Accordingly, as drive pulley 37 rotates in the direction of the arrow associated therewith web 29 will be pulled taut against roller 32 restrained to some limited extent by the action of brake shoe 44 acting upon an axle 47 supporting roll 42.

I claim:

1. A record element comprising a maximum of two layers of matter, one layer being formed from a mixture of magnetic and resin materials to provide a self-supporting layer, and a second layer forming a coating of photoresponsive chemical material applied to one side of said one layer, said mixture including sufficient magnetic material to cause said one layer to be sufficiently opaque to prevent exposure of said coating to light passing through said layer so as to permit said element to record information thereon both photographically and magnetically.

2. A method of forming an elongate web of material for magnetically and photographically recording information thereon respectively on opposite faces thereof comprising the steps of casting a mixture of resin and sufficient magnetic material to form a self-supporting web thereof opaque to visible light, and in darkness passing one face of said web across and in contact with the surface of a body of photoresponsive chemical material to coat one side of said web.

3. A method of forming an elongate web of material for magnetically and photographically recording information thereon respectively on opposite faces thereof comprising the steps of forming a fluid body of resin and magnetic material, rotating a smooth cylindrical surface to pass into and out of said body in a manner applying a sufficient amount of material from said body to said surface to form a self-supporting web thereof, peeling the applied material from said surface to form said web thereof, and passing one face of said web across the surface of and in contact with a body of photoresponsive material to coat one side of said web therewith, said fluid body having sufficient magnetic material therein to cause said web to be sufficiently opaque to preclude exposure of the coated side of said web to light passing through said web.

4. A method of forming a length of elongate record material having a maximum of two layers starting with a self-supporting length of magnetic material formed as a maximum of one layer to provide a web thereof, said layer having sufficient magnetic material therein to cause said layer to be opaque to visible light, and including the further steps of passing one face of said web across the surface of and in contact with a body of photoresponsive material to coat one side of said web to provide a second layer carried by said one layer.

5. A roll of opaque, magnetic, photointeractive material comprising a mixture of magnetic and resin materials formed as a self-supporting layer of said mixture, and a coating of photointeractive material applied to one side thereof, said mixture including sufficient magnetic material to cause said layer to be sufficiently opaque to prevent exposure of said coating through said layer.

* * * * *